US008692954B2

(12) United States Patent
Lee et al.

(10) Patent No.: US 8,692,954 B2
(45) Date of Patent: Apr. 8, 2014

(54) DISPLAY DEVICE HAVING REDUCED THICKNESS AND IMPROVED LUMINANCE

(75) Inventors: Won-Il Lee, Yongin (KR); Nam-Jin Jang, Yongin (KR); Joo-Young Lee, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 249 days.

(21) Appl. No.: 13/160,287

(22) Filed: Jun. 14, 2011

(65) Prior Publication Data
US 2012/0069261 A1  Mar. 22, 2012

(30) Foreign Application Priority Data
Sep. 17, 2010 (KR) .......................... 10-2010-0092021

(51) Int. Cl.
*G02F 1/1335* (2006.01)

(52) U.S. Cl.
USPC .......................................................... 349/58

(58) Field of Classification Search
None
See application file for complete search history.

(56) References Cited

U.S. PATENT DOCUMENTS

2009/0147174 A1*   6/2009   Ha et al. ........................... 349/58

FOREIGN PATENT DOCUMENTS

| KR | 10-2006-0133821 | 12/2006 |
| KR | 10-2007-0025054 | 3/2007 |

* cited by examiner

*Primary Examiner* — Sarah Hahm
(74) *Attorney, Agent, or Firm* — Robbert E. Bushnell, Esq.

(57) ABSTRACT

A display device includes a display panel, a plurality of optical sheets disposed under the display panel, a light guiding plate disposed under the optical sheets and including a light guiding protrusion protruding toward a side direction from a light guiding corner, and a support frame for supporting the display panel and including a protrusion cover in the frame corner to cover the light guiding protrusion. The height of an upper surface of the protrusion cover is preferably no less than the height of an upper surface of the optical sheets. The display device prevents the problem in molding of the protrusion cover of the support frame by increasing the thickness of the protrusion cover. Accordingly, a small-sized thin film light guiding plate can be applied to the display device so that luminance of the display device can be improved, and the thickness of the display device can be reduced.

9 Claims, 5 Drawing Sheets

DISPLAY DEVICE HAVING REDUCED THICKNESS AND IMPROVED LUMINANCE

CLAIM OF PRIORITY

This application makes reference to, incorporates the same herein, and claims all benefits accruing under 35 U.S.C. §119 from an application earlier filed in the Korean Intellectual Property Office on Sep. 17, 2010 and there duly assigned Serial No. 10-2010-0092021.

BACKGROUND OF THE INVENTION

1. Field of the Invention

The present invention relates generally to a display device and, more particularly, to a liquid crystal display (LCD) having reduced thickness and improved luminance.

2. Description of the Related Art

A display device having a liquid crystal display, which is a not-emissive element, requires a backlight assembly for receiving light. The backlight assembly includes a light source unit, a light guiding plate, a reflecting sheet, and a plurality of optical sheets. In addition, the light guiding plate, the reflecting sheet, and the plurality of optical sheets are supported by using a support frame and a receiving member.

Luminance of the display device is inversely proportional to the size of a light guiding plate through which light generated from the light source unit is passed, and therefore, a light guiding plate which is smaller in size than the optical sheet is used to improve luminance of the display device. In addition, a thin film light guiding plate having a slim thickness is applied to the display device so as to reduce the thickness of the display device.

However, when the small-sized thin film light guiding plate is applied, the thickness of a protrusion cover of a support frame, which covers a light guiding protrusion of the light guiding plate, becomes slim so that the protrusion cover of the support frame cannot be molded.

The above information disclosed in this Background section is only for enhancement of an understanding of the background of the described technology, and therefore it may contain information which does not form the prior art which is already known in this country to a person of ordinary skill in the art.

SUMMARY OF THE INVENTION

The invention has been developed in an effort to provide a display device including a support frame and an optical sheet which can be applied to a small-sized thin film light guiding plate.

A display device according to an exemplary embodiment of the invention comprises: a display panel for displaying an image; a plurality of optical sheets disposed under the display panel; a light guiding plate disposed under the optical sheets and including a light guiding protrusion protruding toward a side direction from a light guiding corner; a support frame for supporting the display panel and including a protrusion cover in the frame corner to cover the light guiding protrusion; and a receiving member for supporting the support frame and the light guiding plate. The height of an upper surface of the protrusion cover may be greater than or equal to that of an upper surface of the optical sheet.

The protrusion cover may protrude from an upper side of the support frame disposed in the frame corner.

The width of the protrusion cover may be 0.4 mm to 2 mm, and the thickness of the protrusion cover may be 0.15 mm to 2 mm.

The protrusion cover protruding from the frame corner of the support frame and a support frame of the support frame may form a light guiding protrusion receiving groove.

The sheet corner of the optical sheet may include a protrusion cover receiving groove which is engaged with the protrusion cover.

A frame side of the support frame may include a sheet support supporting a sheet side of the optical sheet.

A side surface of the light guiding plate disposed in a light guiding side of the light guiding plate may face a sheet support of the support frame.

A light guiding protrusion of the light guiding plate disposed in a corner of the light guiding plate may be received in the light guiding protrusion receiving groove.

The light guiding plate may be smaller in size than the optical sheet.

The display device may further include a reflecting sheet disposed under the light guiding plate and a receiving member which receives the support frame, the light guiding plate, and the reflecting sheet.

According to the exemplary embodiments of the invention, the height of the upper surface of the protrusion cover of the support frame is greater than or equal to the height of the upper surface of the optical sheets, and the sheet corners of the optical sheets have the protrusion cover receiving groove which is engaged with the protrusion cover such that the thickness of the protrusion cover of the support frame, covering the light guiding protrusion of the light guiding plate, can be thickened. Thus, the problem that the protrusion cover cannot be molded due to the slim thickness of the protrusion cover of the support frame can be prevented.

Accordingly, a small-sized thin film light guiding plate can be applied to the display device so that luminance of the display device can be improved and the thickness of the display device can be reduced.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
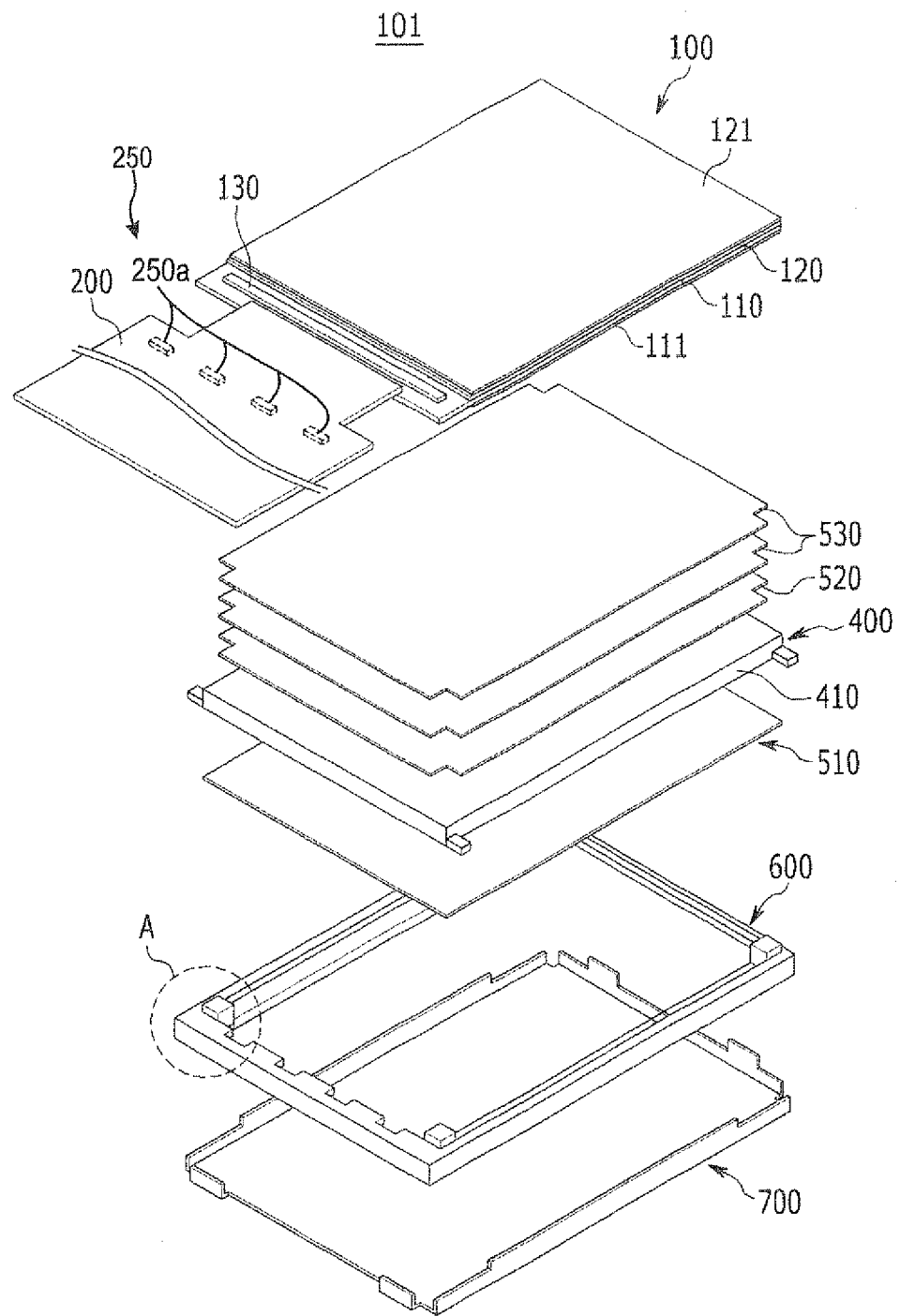
FIG. 1 is an exploded perspective view of a display device according to an exemplary embodiment of the invention.

The present invention will be described more fully hereinafter with reference to the accompanying drawings, in which exemplary embodiments of the invention are shown. As those skilled in the art will realize, the described embodiments may be modified in various different ways, all without departing from the spirit or scope of the present invention.

Like reference numerals designate like elements throughout the specification.

In addition, the size and thickness of each component shown in the drawings are arbitrarily shown for understanding and ease of description, but the present invention is not limited thereto.

A display device according to an exemplary embodiment will now be described in further detail with reference to FIG. 1.

Figure 2:
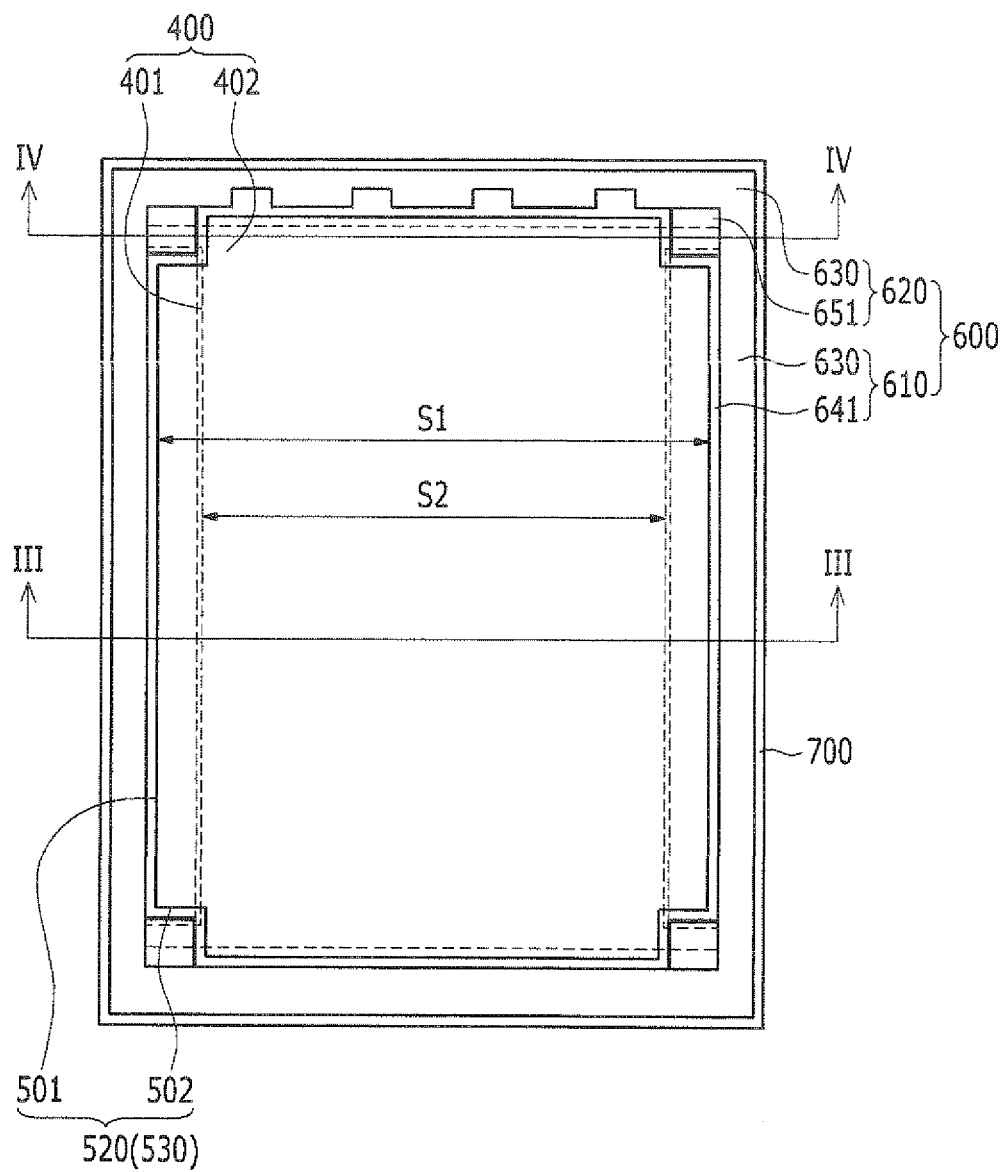
FIG. 2 is a top plan view of an optical sheet, a light guiding plate, a reflecting sheet, a support frame, and a receiving member of FIG. 1 in the stacked state.
Figure 3:
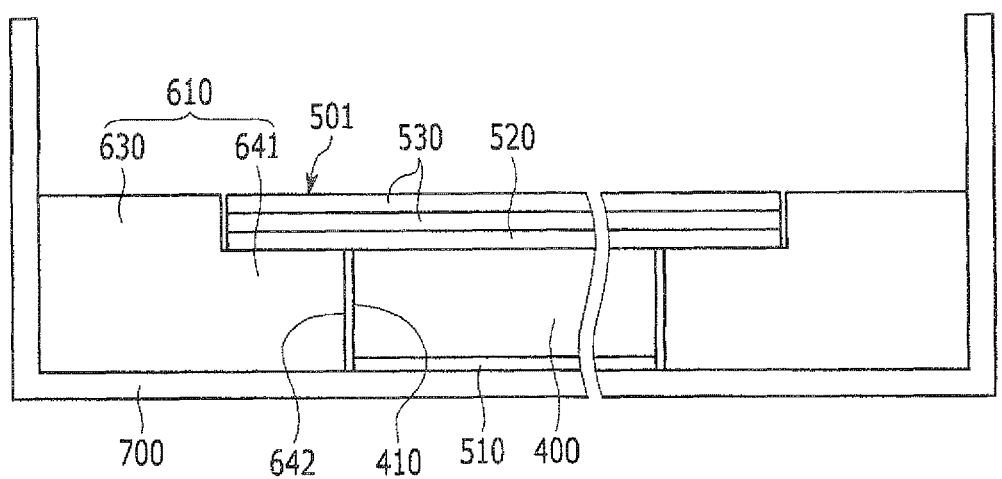
FIG. 3 is a cross-sectional view of FIG. 2, taken along the line
Figure 4:
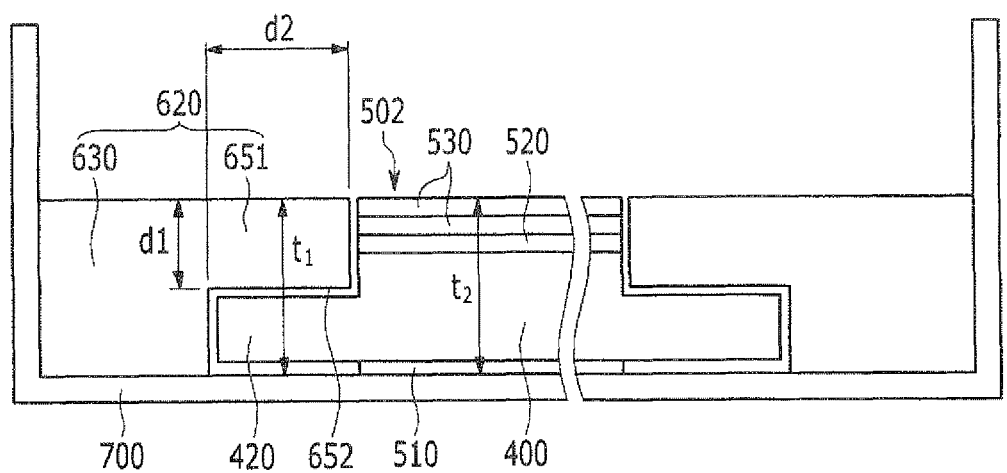
FIG. 4 is a cross-sectional view of FIG. 2, taken along the line IV-IV.
Figure 5:
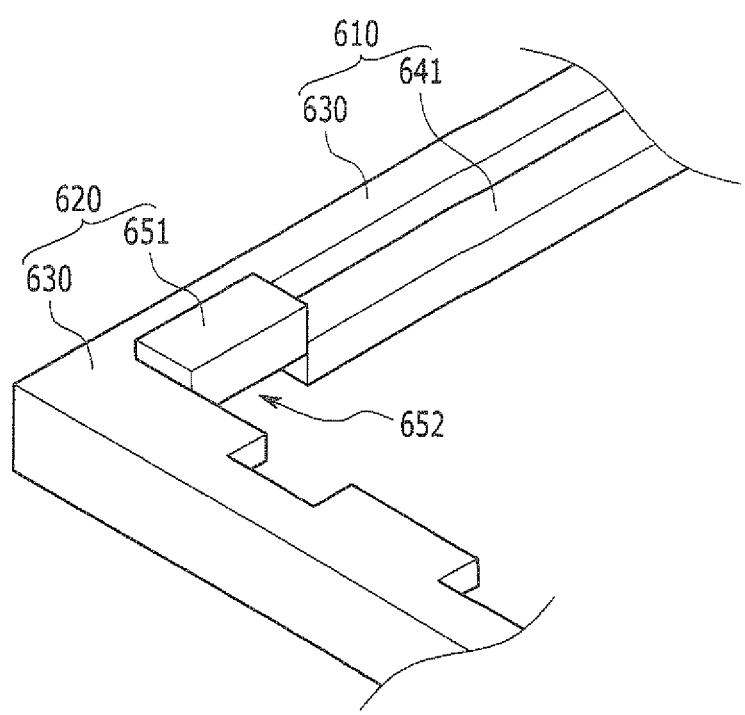
FIG. 5 is a partially enlarged perspective view of a portion A in FIG. 1.

FIG. 1 is an exploded perspective view of a display device according to an exemplary embodiment of the invention; FIG. 2 is a top plan view of an optical sheet, a light guiding plate, a reflecting sheet, a support frame, and a receiving member of FIG. 1 in the stacked state; FIG. 3 is a cross-sectional view of FIG. 2, taken along the line FIG. 4 is a cross-sectional view of FIG. 2, taken along the line IV-IV; and FIG. 5 is a partially enlarged perspective view of a portion A in FIG. 1.

As shown in FIG. 1, a display device 101 includes a display panel 100, a light source unit 250, a light guiding plate 400, a reflecting sheet 510, a plurality of optical sheets 520 and 530, a support frame 600, and a receiving member 700.

The display device 101 further includes a flexible printed circuit board (FPCB) 200 for supplying a driving signal to the display panel 100, and an integrated circuit chip 130. The FPCB 200 is connected to one edge of the display panel 100 and the integrated circuit chip 130 is mounted on the display panel 100.

In the exemplary embodiment, the FPCB 200 is integrally formed with the light source unit 250. That is, the light source unit 250 is mounted on the FPCB 200. However, the exemplary embodiment is not limited thereto. Thus, the light source unit 250 may be formed separately from the FPCB 200, and then connected to the FPCB 200.

In addition, several circuit elements for generating a driving signal supplied to the display panel 100 are mounted on the FPCB 200.

The display panel 100 includes a first substrate 110, a second substrate 120 arranged opposite to the first substrate 110, and a liquid crystal layer (not shown) disposed between the first substrate 110 and the second substrate 120. In this case, the first substrate 110 becomes a rear substrate and the second substrate 120 becomes a front substrate. The second substrate 120 is smaller in size than the first substrate 110.

In addition, the display panel 100 may further include a first polarizing member 111 and a second polarizing member 121 attached to a rear side of the first substrate 110 and a front side of the second substrate 120, respectively.

The integrated circuit chip 130 is mounted on an edge of the substrate 110 without being overlapped with the second substrate 120. In addition, the FPCB 200 is connected to the edge of the first substrate 110 where the integrated circuit chip 130 is mounted.

The display panel 100 displays an image through a plurality of pixels. In this regard, a pixel refers to a minimum unit for displaying a screen. The first substrate 110 includes a thin film transistor (TFT) as a switching element and a pixel electrode (not shown) connected to the thin film transistor which are formed in each pixel. The second substrate 120 includes a common electrode (not shown). In addition, one of the first substrate 110 and the second substrate 120 includes a color filter. Furthermore, the liquid crystal layer (not shown) is disposed between the pixel electrode of the first substrate 110 and the common electrode of the second substrate 210.

When the thin film transistor is turned on, an electric field is formed between the pixel electrode and the common electrode. Due to the electric field, a liquid crystal alignment angle of the liquid crystal layer (not shown) disposed between the first substrate 110 and the second substrate 120 is changed, and light transmittance of each pixel in the display panel 100 is changed.

With such a configuration, the display panel 100 controls transmittance of light passing through the display panel 100 so as to acquire a desired image.

The light source unit 250 generates light and supplies the light to the display panel 100. In addition, the light source unit 250 is formed of a plurality of light emitting diodes (LEDs).

In the exemplary embodiment, the light source unit 250 is disposed under an edge of the display panel 100 connected to the FPCB 200. In addition, the light source unit 250 is mounted on the FPCB 200, and receives a necessary light source control signal from the FPCB 200.

For better understanding and ease of description, the FPCB 200 in FIG. 1 is open. When the display device 101 is assembled, one edge of the display panel 100 and a part of the FPCB 200 are bent so that other portions of the FPCB 200 face toward the rear side of the display panel 100. In this case, the light source unit 250 is disposed under one edge of the display panel 100.

In addition, in FIG. 1, the light source unit 250 includes four light emitting diodes 250a, but the exemplary embodiment is not limited thereto. Thus, the light source unit 250 may include any number of light emitting diodes 250a as necessary.

The light guiding plate 400 is arranged opposite the rear side of the display panel 100. In further detail, the light guiding plate 400 has a light incidence plate arranged opposite the light source unit 250, and a light emission plate arranged opposite the display panel 100. The light guiding plate 400 guides light emitted from the light source unit 250 and evenly transmits the light to the rear side of the display panel 100.

The plurality of optical sheets 520 and 530 are disposed between the light guiding plate 400 and the display panel 100. The plurality of optical sheets 520 and 530 further diffuse light moving toward the display panel 100 from the light guiding plate 400 and reinforce luminance. In further detail, in the exemplary embodiment, the plurality of optical sheets include a diffusion sheet 520 and a pair of prism sheets 530. The diffusion sheet 520 is disposed on the light guiding plate 400 while being opposite thereto and further diffuses light emitted from the light guiding plate 400. The prism sheets 530 are disposed on the diffusion sheet 520, and collect light relative to a front direction. In this case, the prism sheets 530 formed in a pair have textures formed in directions which cross each other.

In addition, the light guiding plate 400 includes four light guiding corners 402 and four light guiding sides 401 (FIG. 2). In addition, the light guiding plate 400 includes a light guiding protrusion 420 (FIG. 4) protruding to a side direction from the light guiding corner 402. That is, among four side surfaces of the light guiding plate 400, one side surface arranged opposite to the light source unit 250 becomes the light incidence plate, and at least one of light guiding protrusions 420 is formed at least one of the three side surfaces, excluding the light incidence plane.

The support frame 600 includes four frame corners 620 and four frame sides 610 (FIG. 5). A frame base 630 is formed at each of the frame corners 620 and the frame sides 610 of the support frame 600. A sheet support 641, extending from a lower side surface of the support frame, is further formed in the frame side 610, and a protrusion cover 651, protruding from an upper side surface of the support frame 600, is further formed in the frame corner 620.

The support frame 600 supports the display panel 100, and the reflecting sheet 510, the light guiding plate 400, and the optical sheets are disposed in the support frame 600 (FIG. 1).

In this case, the frame base 630 and the protrusion cover 651 disposed in the frame corner 620 form a light guiding protrusion receiving groove 652 (FIG. 4). Thus, the protrusion cover 651 covers the light guiding protrusion 420, and the light guiding protrusion 420 is received in the light guiding protrusion cover receiving groove 652.

In addition, a side surface 410 of the light guiding plate 400 disposed in the light guiding side 401 of the light guiding plate 400 faces the side surface 642 of the sheet support 641 of the support frame 600 (FIG. 3).

The optical sheets 520 and 530 include four sheet corners 502 and four sheet sides 501 (FIG. 2). The sheet corners 502 of the optical sheets 520 and 530 include a protrusion cover receiving groove 652, a part of which is cut and thus engaged with the protrusion cover 651 (FIG. 4).

In order to improve luminance of the display device, the light guiding plate 400 is smaller in size than the optical sheets 520 and 530. That is, a horizontal length S2 (FIG. 2) of the light guiding plates 400 is smaller than a horizontal length S1 of the optical sheets 520 and 530. Accordingly, the sheet support 641 of the support frame 600 supports the sheet side 501 of the optical sheets 520 and 530.

A thickness d1 (FIG. 4) of the protrusion cover 651 is preferably 0.15 mm to 2 mm. When the thickness d1 of the protrusion cover 651 is smaller than 0.15 mm, the protrusion cover 651 may not be molded during the manufacturing process, and when the thickness d1 of the protrusion cover 651 is greater than 2 mm, the entire thickness of the display device may be increased.

In addition, a width d2 (FIG. 4) of the protrusion cover 651 is preferably 0.4 mm to 2 mm. When the width d2 of the protrusion cover 651 is smaller than 0.4 mm, the protrusion cover 651 may not be molded during the manufacturing process, and when the width d2 of the protrusion cover 651 is greater than 2 mm, the display area of the display device may be reduced.

A height t1 of an upper surface of the protrusion cover 651 is preferably equal to or the same as a height t2 (FIG. 4) of an upper surface of each of the optical sheets 520 and 530. As described, the thickness of the protrusion cover 651 is set to the height t1 of the upper surface of the protrusion cover 651 and is greater than or equal to the height t2 of the optical sheets 520 and 530 so that the problem in which the protrusion cover 651 cannot be molded due to the slim thickness of the protrusion cover 651 can be prevented. In addition, when the height t1 of the upper surface of the protrusion cover 651 is greater than or equal to the height t2 of the upper surface of the optical sheets 520 and 530, the sheet corner 502 is partially cut, and the protrusion cover receiving groove 652, which is engaged with the protrusion cover 651, may be formed therein so as to thereby prevent the sheet corner 502 of the optical sheets 520 and 530 from being lifted.

The reflecting sheet 510 is disposed on a rear side of the light guiding plate 400, that is, on an opposite side of the light emission plate of the light guiding plate 400 (FIG. 4). The reflecting sheet 510 reflects light, incident from the light source unit 250 to the light guiding plate 400 and moving toward an opposite direction relative to a direction which faces the display panel 100, to a direction which faces the display panel 100. Accordingly, light loss can be reduced and light can be further diffused in the light guiding plate 400.

The receiving member 700 (FIG. 1) receives the support frame 600, the light guiding plate 400, the reflecting sheet 510, the light source unit 250, and the plurality of optical sheets 520 and 530, and can receive the display panel 100 as necessary.

As described, the height t1 (FIG. 4) of the upper surface of the protrusion cover 651 of the support frame 600 is greater than or equal to the height t2 of the upper surface of the optical sheets 520 and 530, and the sheet corners 502 of the optical sheets 520 and 530 have the protrusion cover receiving groove 652 which is engaged with the protrusion cover 651 such that the thickness d1 of the protrusion cover 651 of the support frame 600, covering the light guiding protrusion 420 of the light guiding plate 400, can be thickened. Thus, the problem in which the protrusion cover 651 cannot be molded when the thickness d1 of the protrusion cover 651 of the support frame 600 is thin can be prevented.

Accordingly, the small-sized thin film light guiding plate 400 can be applied to the display device, and therefore luminance of the display device can be improved and the thickness thereof can be reduced.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device, comprising:
a display panel displaying an image;
a plurality of optical sheets disposed under the display panel;
a light guiding plate disposed under the optical sheets, and including a light guiding protrusion protruding toward a side direction from a light guiding corner;
a support frame supporting the display panel, and including a protrusion cover positioned at a corner of the frame to cover the light guiding protrusion; and
a receiving member accommodating the support frame and the light guiding plate, a height of an upper surface of the protrusion cover being not less than a height of an upper surface of the optical sheets, and the light guiding plate being smaller in size than the optical sheets.

2. The display device of claim 1, wherein the protrusion cover protrudes from an upper side of the support frame disposed in the frame corner.

3. The display device of claim 2, wherein a width of the protrusion cover is in a range of 0.4mm to 2mm, and a thickness of the protrusion cover is in a range of 0.15mm to 2mm.

4. The display device of claim 1, wherein the protrusion cover protrudes from the frame corner of the support frame, and the protrusion cover and the support frame form a light guiding protrusion receiving groove.

5. The display device of claim 1, wherein a sheet corner of the optical sheets comprises a protrusion cover receiving groove accommodating insertion of the protrusion cover.

6. The display device of claim 5, wherein the light guiding protrusion of the light guiding plate is disposed in a corner of the light guiding plate, and is received in a light guiding protrusion receiving groove.

7. The display device of claim 1, wherein a frame side of the support frame comprises a sheet support for supporting a sheet side of the optical sheets.

8. The display device of claim 1, wherein a side surface of the light guiding plate is disposed in a light guiding side of the light guiding plate and faces a sheet support of the support frame.

9. The display device of claim 1, further comprising:
a reflecting sheet disposed under the light guiding plate; and
the receiving member accommodating the support frame, the light guiding plate, and the reflecting sheet.

* * * * *